June 30, 1953     D. SKALKA     2,643,457
NAVIGATIONAL AID DEVICE
Filed March 11, 1949     8 Sheets-Sheet 1

INVENTOR.
DAVID SKALKA
BY
Kenyon & Kenyon
ATTORNEYS

June 30, 1953 D. SKALKA 2,643,457
NAVIGATIONAL AID DEVICE
Filed March 11, 1949 8 Sheets-Sheet 2

INVENTOR.
DAVID SKALKA
BY
Kenyon & Kenyon
ATTORNEYS

Fig. 5.

INVENTOR.
DAVID SKALKA
BY
Kenyon & Kenyon
ATTORNEYS

June 30, 1953  D. SKALKA  2,643,457
NAVIGATIONAL AID DEVICE
Filed March 11, 1949  8 Sheets-Sheet 5

INVENTOR.
DAVID SKALKA
BY
ATTORNEYS

Patented June 30, 1953

2,643,457

UNITED STATES PATENT OFFICE 2,643,457

NAVIGATIONAL AID DEVICE

David Skalka, New York, N. Y.

Application March 11, 1949, Serial No. 80,880

6 Claims. (Cl. 33—46.5)

1

This application is a continuation in part of my application Serial No. 61,820 filed November 24, 1948, entitled Navigational Aid Devices, now Patent No. 2,565,745, granted August 28, 1951.

While this invention may be considered as applicable to many problems involving the measurement of the parameters of relative motion between objects or the performance of control functions governed by such parameters, it finds particularly advantageous application in the field of aircraft navigation and contemplates particularly the provision of mechanisms for indicating, preferably continuously and automatically, the speed and direction of travel of an aircraft or like device relative to the ground over which it is in flight—and this with or without the use of mechanisms controlling the flight in response to the indicated speed or direction.

As is well known in the aircraft navigation and related arts, it is often necessary to determine speed and direction of the craft relative to the ground as well as the air. Where, as is usually the case, the air is in relative motion with respect to the ground, the two relations are not identical. The true speed with respect to the ground may be more or less than the speed through the air depending upon whether the wind is aiding or opposing flight. At the same time, where the air is moving in a direction having a component across the intended direction of flight, the actual direction of the craft's flight will be caused to drift away from the intended direction for which reason the directions of speed relative to the air and ground will be angularly disposed with respect to each other by an angle which is generally termed the "drift angle."

Numerous devices for the measurement of the ground speed or the "drift angle" are known to the prior art; however, to my knowledge, none of these have provided continuously functioning mechanisms which automatically regulate themselves to the speed and direction of flight at all times so that they may operate to provide instantaneous indications which might be used, for example, to provide a continuous record of the various parameters or which may be used as control factors governing regulatory mechanisms controlling navigation equipment such as automatic pilot or other devices.

Accordingly, it is the general object of the invention to provide a new and improved control method and instrumentation for the navigation of aircraft and like devices.

It is a further and more specific object of my invention to provide a new and improved method and means for measuring and indicating ground speed either as respects magnitude or angular relations, or both.

It is a still further object of the invention to provide such a means which automatically regulates itself to the speed and direction of flight at all times whereby continuous indications of the necessary data are provided.

The features of the invention upon which patent protection is sought are set forth in the appended claims. The invention itself together with further objects thereof and its advantages will best be understood by reference to the following specification when taken in connection with the accompanying drawings in which:

While

Throughout the figures like numeral have been used to designate like or identical parts.

GENERAL PROBLEM

Figure 1:
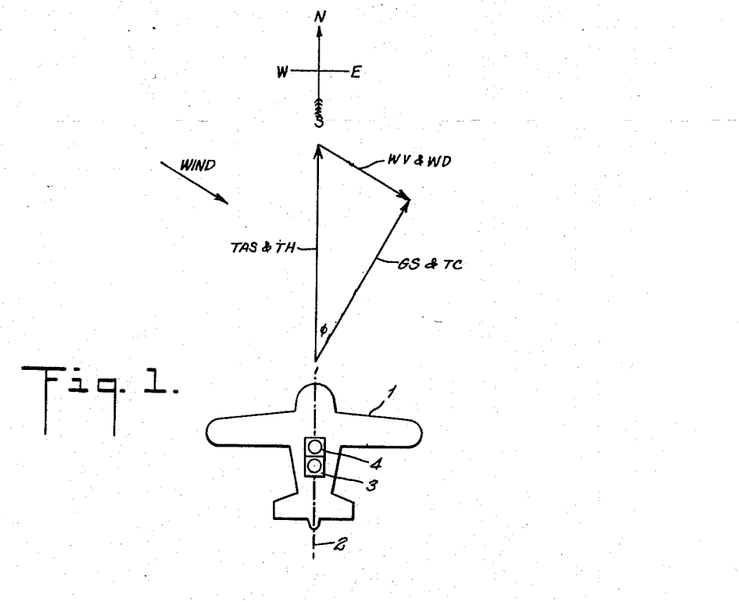
Fig. 1 is a schematic drawing employed to illustrate the general problems of navigation with which the invention is concerned.

Referring now to Fig. 1 illustrating a typical navigational problem for aircraft, the aircraft I is for convenience of illustration, assumed to be flying in the intended or true direction north, i. e., with its longitudinal axis 2 directed true north, as would normally be determined from the plane's compass. The vector TH (True Heading) indicates that true direction while its length is a measure of the true air speed (TAS). Again, for convenience, assume that the air through which the plane is flying, is being carried by the wind in a direction indicated by the left hand arrow. It will be understood then that the plane's actual course will be caused to "drift" by a component having a somewhat southeasterly direction at the velocity of and with the direction of the wind. This drift component of the plan's motion may be represented by the vector WD (Wind Direction) the length of which is a measure of the wind velocity (WV). As will be quite apparent to those skilled in the art, the resultant actual direction of the motion of the plane with respect to the ground may be represented by the resultant vector TC (True Course) the length of which is a measure of the true speed with respect to the ground (GS). The angle of separation between the vector TC and the vector TH is commonly known as the drift angle $\phi$.

In situations such as just outlined, it is desirable to have a measure of both the ground speed (GS) and its relative direction, i. e., drift angle $\phi$. The prior art discloses several devices for measuring these factors independently. For example, drift angle measurement may be accomplished by aligning elongated viewing apertures with the apparent direction of motion of objects on the ground and comparing the direction of alignment with the direction in which the plane's longitudinal axis is directed (c. f. U. S. Letters Patent 2,363,600—Lawlor); while the magnitude of ground speed may be measured by synchronizing the speed of motion of a moving viewing aperture within the plane with the apparent speed of motion of objects on the ground (c. f. U. S. Letters Patent 1,385,776—Chamberlain). In these cases, as with my present invention, the observations of the ground are made simply by some sort of an optical system 3 which provides a view from the bottom of the plane of the ground pattern below. For purposes of comparison, a compass 4 may be positioned adjacent system 3. It will also be understood that the system is suitably stabilized as by a gyroscopic means.

These prior art devices are however lacking in any means for simultaneously indicating both the drift angle and the ground speed and particularly lacking in any mechanism which will automatically and continuously follow the changes in these parameters. Such means are provided by the several embodiments of my invention illustrated hereinafter. The first of these provides such means by use of the principle illustrated broadly by Fig. 2, which I shall now proceed to describe.

SEMI-MECHANICAL EMBODIMENTS

General principle

Figure 2:
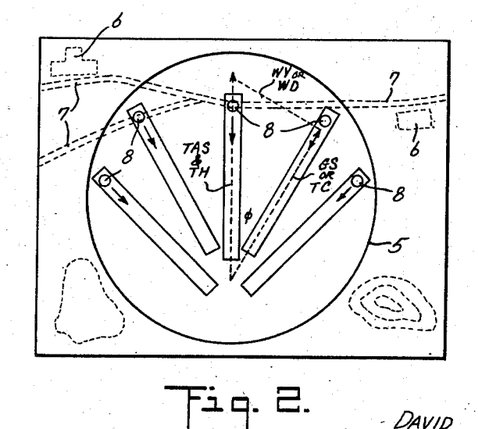
Fig. 2 is a schematic drawing illustrating the essential principles of a semi-mechanical embodiment of the invention and their application to the problems illustrated by Fig. 1.

In connection with Fig. 2, it is assumed that some sort of an optical system may be provided which will afford an image of the terrain beneath the plane and over which it is passing, and that the field of vision of such an optical system might be that indicated within the circle 5. It will be noted that the ground pattern (of buildings 6 and roads 7, etc.) indicated by the dotted lines will have some portion thereof falling within the field of view represented by the circle 5. It may be assumed that in a manner analagous to that illustrated by Fig. 1 the plane carrying the optical system will be traveling over the terrain in some sort of speed-direction relationship such as that indicated by the vectors TC and TH, separated by the angle $\phi$ as before. Assume now that the system is so constructed as to provide a suitable plurality of viewing apertures 8 or "eyes" all continuously moving at different angles to the longitudinal axis of and toward the rear of the plane, i. e., generally with a component in the direction of the apparent motion of objects on the ground. Such a mechanism may be constructed in a plurality of ways two of which I shall illustrate hereinafter. If a suitable plurality of these aperture mechanisms be provided, it will be the general case that at least one of them will, at least approximately, align itself in respect of its direction of motion with the direction of apparent motion of objects on the ground. If one of them is not exactly so aligned, then it will be possible to interpolate as between the two adjacent ones which are most closely aligned.

Now, as will be apparent from the geometry of Figs. 1 and 2, that aperture 8, the motion of which is assumed to be in direction alignment with the apparent ground motion, may also be so adjusted in respect to its speed of motion toward the rear of the plane that the aperture will overlap or encompass within its field of view some selected fixed portion of the ground image at all points of the aperture's motion, which means that the light intensity transmitted through the aperture will be substantially constant for the entire length of its travel. On the other hand, because of their different alignments of their various directions of motion with respect to apparent ground motion, none of the other apertures will be able to encompass in this manner a single such portion of the ground image and maintain it within the field of view of the corresponding aperture, which means that for all of the remaining apertures, there will be a considerable fluctuation of the light transmitted through those apertures as they travel along their paths of motion. It is preferable and convenient, although not essential, that the speed of motion of all of the plurality of apertures be the same, and it may be assumed that means to that end may be provided.

With the foregoing situation, it will be apparent that one may determine and indicate the direction of the vector TC by selecting the aperture which has its motion in alignment with the apparent motion of ground objects; while at the same time if one adjusts the speed of travel of the various apertures until the selected one moves in apparent synchronism with the objects on the ground, he may directly relate the true ground speed to the known speed of travel of the aperture.

Selecting, indicating and regulating

As a next step in the evolution of an illustrative apparatus utilizing the principles of my invention, there may be provided means for automatically selecting and indicating which of the plurality of apertures 8 has attained synchronism of motion with respect to the ground objects both as respects the speed and direction; as well as means for automatically regulating the system to attain and maintain such synchronism. Further, the system may include mechanisms arranged to operate suitable dial indicators or other calibrated means which furnish a direct visual indication of drift angle and speed to the pilot, or other mechanisms arranged to furnished such information to automatic pilot devices for controlling the same. All of these means and mechanisms may be arranged to control and vary the speed of travel of the apertures to make them conform to changing apparent motions of the objects on the ground as the plane's speed or course changes.

Figure 3:
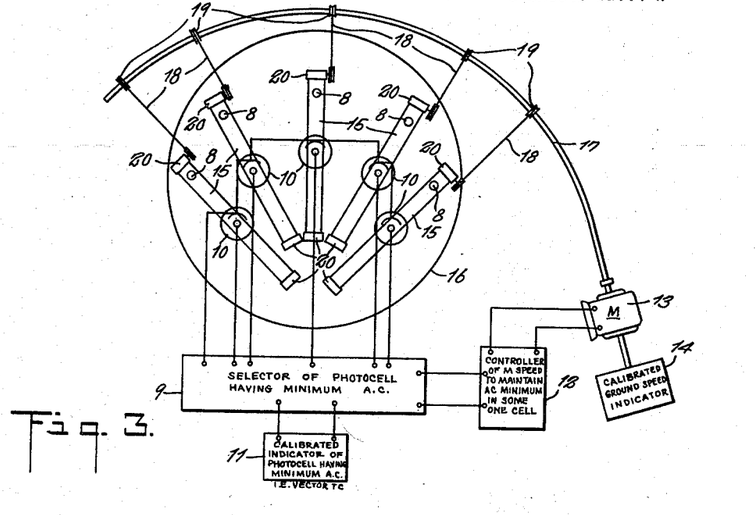
Fig. 3 is a schematic illustration of a composite control apparatus as applied to a mechanism constructed in accordance to the principles of Fig. 2.

Means to these ends are schematically indicated in the composite illustration of Fig. 3. Broadly speaking the basic principle of selection here utilized in a selector 9 may be illustrated by the circuit which I shall later describe in more detail in connection with Fig. 5 and which may comprise, in general, a multiple rectifying circuit operating in conjunction with a plurality of photoelectric-cells 10 each associated with one of the moving apertures 8 and positioned to be energized by the portion of the ground image passing through its associated aperture at all points of the aperture's travel. The rectifying circuit may be so arranged that the fluctuating components of the photoelectric currents induced in each photoelectric-cell are rectified. If the circuit be also so arranged that it will indicate on an indicator 11 the photoelectric-cell which has the minimum rectified current (i. e., minimum fluctuating current component or minimum light fluctuation) that latter photoelectric-cell will correspond to that moving aperture which is aligned and synchronized with the true ground speed. This is because only the particular aperture which has been aligned and synchronized with the apparent ground motion will have a constant or substantially constant amount of light coming through it for the reasons already indicated. While it may be only ideally true that only one of the plurality of apertures may be thus aligned, nevertheless, even if the vector TC should fall between two apertures rather than on a single one, the two adjacent apertures will approach the zero light fluctuation condition more than all others and thus they may both be selected and interpolation made between them. All of the remaining apertures, and consequently the photoelectric-cells associated therewith, will have substantial variable current components and therefore a substantial rectified output.

Using this minimum fluctuating current cell principle, any suitable means 12 may be devised for regulating the aperture speed to synchronize as between the speed of the aperture and the apparent motion of the objects on the ground. In brief, the regulator may simply vary the speed of the aperture until the condition of minimum rectified current is obtained for some one cell (or two cells bracketing vector TC) and then the speed of the driving means, such as motor 13, for the regulated aperture may be calibrated by means 14, such as a tachometer, to give a direct reading of the true ground speed.

While I have illustrated selector 9 as functioning by rectification, it will be understood that the invention contemplates broadly any suitable means for selecting that photoelectric-cell or cells having minimum fluctuating current component. Other and alternative means will be apparent to those skilled in the art.

Referring again to Fig. 3, I have there shown the means providing and moving the apertures as comprising a plurality of endless tapes 15 each designed to be moved along immediately over a suitable screen or plate 16 on which the ground image may be projected, and each provided with an aperture 8. In order to provide for continuous operation, each tape 15 may be provided with a plurality of apertures 8 properly spaced so that as one aperture leaves the excursion path at the lower end a new one will appear at the top, at the same time the apertures of all tapes will preferably be phased with respect to each other such that a new aperture appears in all excursion paths of the series simultaneously immediately after the apertures of the preceding group have simultaneously disappeared.

The mechanism for moving the tapes is illustrated in greater detail in connection with Fig. 4 to be described later and may comprise the motor 13 driving the tapes 15 over suitable end pulleys 20 through flexible shaft 17 and belts 18 connected to driving pulleys 19 on the shaft and pulleys 20.

Over each of the series of tapes 15 there is positioned the corresponding photoelectric cell 10 arranged to receive, through the medium of a suitable optical system (see Fig. 4), the light transmitted through the aperture from the ground pattern. The output of all photoelectric cells 10 may be supplied to the selector mechanism 9 by suitable leads as shown. The selector 9 will, of course, generate some sort of a signal indicative of the photocell corresponding to the tape aligned with the vector TC. That signal may be caused to operate the indicator mechanism 11 which may be of any suitable form such as a dial within the view of the pilot and which will inform him immediately of his true course, TC. At the same time the signal may be caused to operate the control mechanism 12 which may be any suitable means which will continuously adjust the speed of rotation of the motor 13, driving at least the selected tape or tapes at a speed which varies as the apparent ground speed varies. When the tapes are traveling in synchronism with the apparent ground speed as determined by the photocell action of the tape system aligned with the TC, the corresponding motor speed will obviously be a measure of the true ground speed of the plane and the motor may therefore be calibrated to give the pilot, a direct indication of the true ground speed. Any suitable indicator 14 may be provided, for example, a tachometer having a dial mechanism within the direct view of the pilot.

Figure 4:
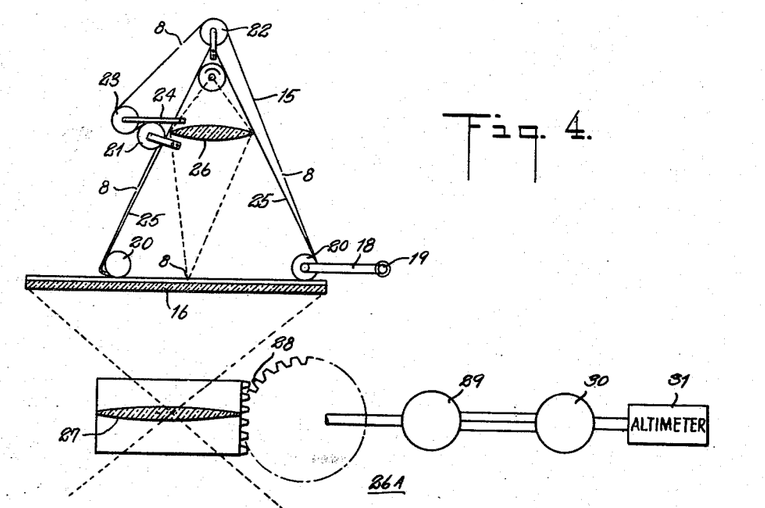
Fig. 4 is a vertical view through one of the moving tape mechanisms of Fig. 3 employed to illustrate the mechanics thereof.

Further details of the mechanism for moving the tapes 15 are illustrated by Fig. 4. It will be there seen that the tapes are each caused to be moved along over a series of rollers 20, 21, 22 and 23; and in order to maintain a proper amount of tension in the tape the pulley 23 may be mounted on a spring arm 24. All of the tapes of the several systems are driven by the motor 13 through belts 18 and reels on the flexible shaft 17 indicated in Fig. 3. Each of the tapes has the plurality of apertures 8 already described, each being positioned at a sufficient distance from its predecessor such that only one aperture appears on the horizontal portion of the tape at a time and also such that the apertures on all horizontal portions will move in phase with respect to each of the tapes, i. e., new apertures will simultaneously enter the horizontal portion for all tapes at the same time and the preceding ones will disappear from it simultaneously. Suitable members 25 may serve as guides for the tapes. The lenses 26 or equivalent optical systems may be employed for projecting the image transmitted through the apertures 8 on the photocell 10.

It will be necessary to take into account differences in altitude of the plane. While corrections for altitude variations may be made by appropriate adjustments of the speed of the tapes, depending on the altitude of the plane, I have preferred to accomplish the same purpose by providing the optical system 26A which is independently adjustable to compensate for any effects of altitude variation and which operates to keep the size of the ground image constant. In that case it is unnecessary to provide any special means to correct the error by variations in the tape speed. The latter optical system is shown as comprising the lens 27 which is adapted to be moved up or down depending upon the altitude requirements by the rack and gear elements 28 rotated in turn by the motor 29. The motor 29 is in turn controlled by the control element 30 which is actuated by the true altimeter 31. It will be understood that those skilled in the art will be able to devise numerous systems of this kind in which the lens system may be adjusted for some average desired altitude or normal altitude of flight and in which the altimeter will cause the control element 30 to rotate the motor one way or the other and thereby raise or lower the lens as required.

*Electrical circuits for selector indicators and regulator*

Figure 5:
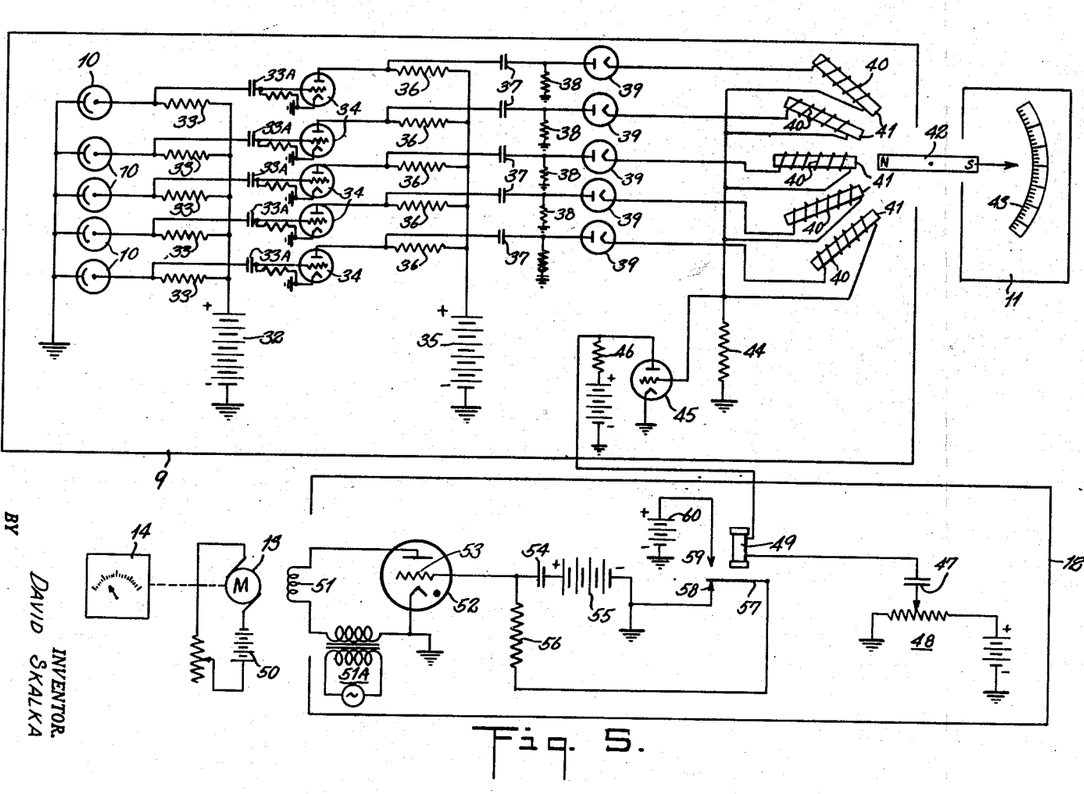
Fig. 5 illustrates the details of the control circuits indicated only schematically in Fig. 3.

In Fig. 5, I have shown one specific circuit which may be employed to accomplish the functions performed by the members 9, 11, 12 and 14 of Fig. 3.

In Fig. 5 the photoelectric-cells 10 are shown as being energized from any suitable source, such as the battery 32, each having in its circuit a resistor 33. It will be understood that there will appear across each of these resistors a voltage having a direct and an alternating component corresponding to the direct and alternating components of current induced in the corresponding photoelectric-cell by the light and the light fluctuations transmitted through the apertures 8 as already discussed. The voltages across these resistors 33 are applied to a corresponding series of grid controlled amplifiers 34 by being applied to their respective grids as indicated through blocking condensers 33A. The amplifier output circuits may be energized by suitable means illustrated by the battery 35 through the series of corresponding anode circuit resistors 36. To each of the output circuits of the amplifiers there is connected a coupled circuit comprising the blocking condensers 37 and resistors 38. It will be understood that the blocking condensers will remove the direct components of current and voltage in the well known manner. The remaining alternating components corresponding to the light fluctuations imposed upon the photo-cells are then caused to be rectified through the series of rectifier tubes 39, the outputs of which flow through the coils of a corresponding series of iron core inductances 40. (If necessary, direct current amplifiers may be interposed between tubes 39 and inductances 40.) The resulting direct currents in the coils of inductances 40 will cause a varying distribution of magnetic intensity in the magnetized cores 41, the variations corresponding to the magnitude of fluctuations in light in the respective photoelectric-cells.

For the purpose of selecting and indicating that cell or system which has the minimum magnetic intensity or minimum light fluctuation, the rotatable magnetized arm 42 of a suitable indicator is provided. This, as will be apparent, will rotate to align itself with the point of minimum magnetic intensity (assuming, for example, that the ends of cores 41 presented to arm 42 are all north polarized). The indicator arrow on the opposite end of arm 42 may be caused to indicate on the calibrated dial 43 the true course selected by the photoelectric-cell system.

In order to control the operation of the motor 13 in response to the circuit just described, the following means may be provided:

The output currents flowing through the coils of inductances 40 are caused to be added together by parallel connection to the resistor 44. The voltage across this resistor will therefore be a measure of the summation of all of the fluctuating current components induced in all the photoelectric-cells. It will be apparent that under normal conditions this voltage will undergo a drop in overall magnitude at the moment when the selected aperture has become aligned both as to speed and direction with the apparent ground motion in the manner already described. This is because the fluctuation of light through that aperture, and consequently the fluctuation of current of the corresponding cell, at that moment will have dropped to zero, or substantially zero, whereas at other times, when no aperture is so aligned, it, in common with the remaining cells and circuits, has substantial fluctuating current.

The voltage across the resistor 44 is applied to the grid of a grid controlled amplifier 45 and, for that reason, the mentioned drop or minimum in the voltage across resistor 44 is converted to a corresponding increase or maximum in the voltage across the resistor 46 in the anode circuit of amplifier 45 by virtue of the well known 180° reversal of phase relationship common to amplifier action. This voltage is applied to one plate of a condenser 47 the other plate of which may be set at an appropriate potential by the potentiometer 48. The circuit interconnecting the condenser 47 and the resistor 46 includes a polarized relay 49, the action and function of which will be described presently.

The armature of the motor 13 which controls the speed of the tape may be energized by any suitable means illustrated by the battery 50, while its speed may be controlled by controlling the energization of its field winding 51 in the manner to be indicated. The field winding is energized from alternating current source 51A through the medium of the grid controlled gaseous rectifier 52 (commonly known as the thyratron). The manner of operation of gaseous rectifiers of this type is well known in the art. Its grid 53 is controlled by the charging and discharging of the condenser 54 through the battery 55 and the resistor 56. The circuit of this condenser and resistor is controlled by the armature 57 of the polarized relay 49 which may be actuated to the lower or upper position in which it is respectively connected to the contact 58, and to the contact 59 connected to the positive end of the battery 60. The tachometer, or indicator 14 is connected to the shaft of the motor 13 as indicated by the Fig. 3.

The manner of operation of the circuit just described is as follows:

The polarized relay 49 is so adjusted that armature 57 is in the lower position on contact 58 until the aforementioned increase in the voltage across resistor 46 occurs. When power is first applied and the motor 13 is started, a charge flows through the resistor 56 to charge the condenser 54 creating initially a high positive voltage at the grid of the rectifier 52. With the resultant initial high current in the rectifier 52, the motor will start relatively slowly because of the high current in its field winding 51. As the condenser 54 charges up, the voltage across the resistor 56 and hence the current through the rectifier 52 and the field winding 51 will decrease and the motor speed will rise. The amount and limit of the increase in speed is controlled by the photo-cell circuit in the following manner:

The resulting direct components of current in the coils of inductances 40 are, as was already stated, directly proportional to the variations in light in the photoelectric-cells and these currents are summed up in the resistor 44. Remembering now that the motor speed has been constantly increasing, it will be realized that a dip or minimum in the total current in resistor 44 will be reached when the motor speed reaches a value such that the aperture in the moving tape aligned with the true course vector TC is synchronized with the apparent speed of the image of the ground. This dip, of course, will appear as a peak or maximum in the current through or voltage across the resistor 46 due to the mentioned 180° phase reversal. The condenser 47 will charge up following the rise across resistor 46. When the peak is passed, the voltage across the condenser 47 will exceed that across the resistor 46 and the current through the polarized relay will reverse causing it to lift armature 57 to contact 59. This imposes a voltage on the grid 53 of the rectifier 52 sufficient to slow the motor down until the peak voltage across resistor 46 is reduced whereupon the relay 49 drops armature 57 back to contact 58 and the motor again begins to speed up. The cycle then repeats keeping the motor speed approaching very closely the correct speed. A high damped mechanical system is recommended for the motor in order to prevent "hunting."

*Alternative semi-mechanical embodiment*

Figure 6:
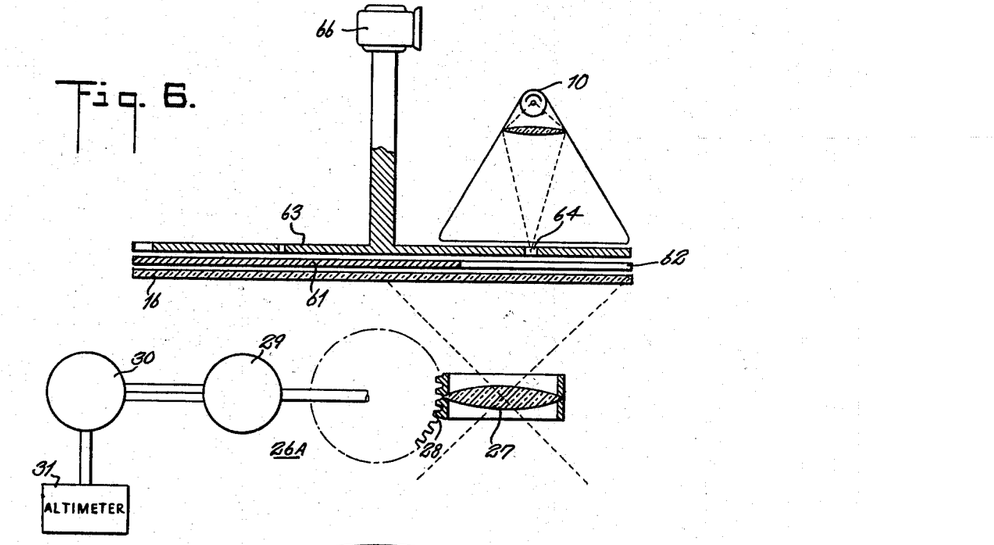
Figs. 6 and 7 illustrate alternative mechanisms for implementing the principles of Figs. 2 and 3 and which are suggested as alternatives to the particular mechanical embodiment of Fig. 3.
Figure 7:
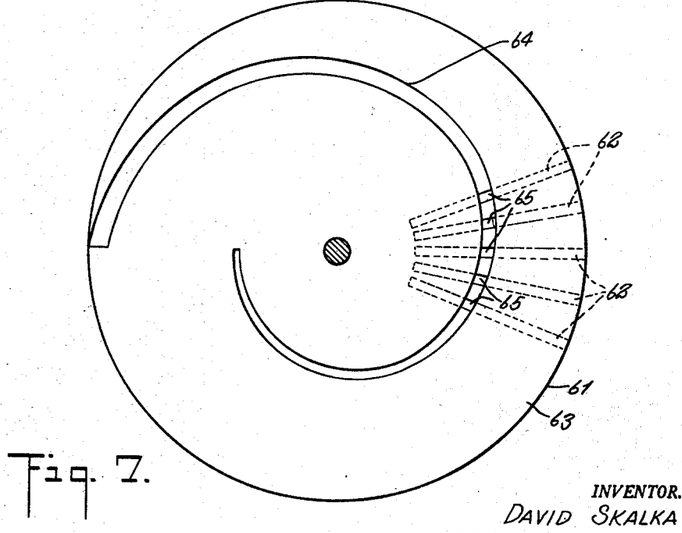

In Figs. 6 and 7, I have illustrated an alternative arrangement for performing the function of the tape system described in Figs. 3 and 4. Fig. 6 illustrates a cross section through the system while Fig. 7 illustrates a plan view from the top omitting the optical systems and the photoelectric cells. In Fig. 6 I have provided a plate 61 having a series of radial slots 62 and a rotating plate 63 having a spiral slot 64. These plates perform the function of the apertures 8 and tapes 15 of Figs. 3 and 4. That is to say, one of the slots 62 will be adapted to be aligned with the true course vector TC as was the case with the tapes in Figs. 3 and 4, while the spiral slot 64 will form with slots 62 inwardly moving apertures 65 functioning the same as apertures 8. Plate 63 is super imposed over plate 61 and arranged to be rotated by the motor 66 in a manner similar to the way in which the motor 13 moved the tapes 15 in 3 and 4. However, the means for providing the moving apertures discussed in connection with Figs. 3 and 4 is slightly different. Here the apertures are provided by the alignment of the spiral slot 64 cut through the plate 63 with the respective slots 62 cut through the lower plate 61. It will be apparent therefore that as the upper plate 63 is rotated by the motor in a counterclockwise direction, apertures 65, provided by the crossing of the spiral groove with each of the radial slots 62, will appear at the periphery and these apertures will proceed continuously inwardly until they reach the inner end of slots 62 whereupon the process will be cyclically repeated by the appearance of the spiral groove again at the outer end of the radial slots 62. Photo-cell systems 10 may be provided as before to observe the fluctuations in light coming through these apertures and the same selector, indicator and control system may be employed to control the speed of the motor, etc. Likewise, the altitude correction system of Fig. 4 may again be employed as shown in Fig. 6.

Some small error may be introduced by variation of the shape of apertures 65 caused by varying angular relations between spiral slot 64 and slots 62 as the apertures 65 move inwardly, such variation causing fluctuation of the area of the selected portion of the ground image in registry with the slot. However, such variations may be minimized to the negligible point by appropriately shaping the slots in ways which will occur to those skilled in the art. For example, the error may be minimized by employing a spiral of minimum pitch such that it crosses slots 62 at angles as close to normal as possible, by minimizing the extension of the inner ends of slots 62 toward the center of rotation, and by employing plates 61 and 63 of as large a diameter as practicable.

The system of the invention may be caused to function either with the use of visible or "invisible" (infra red or other wavelengths) light, the latter being necessary where visibility is obscured by weather conditions. If invisible radiation be employed, numerous means for the adaptation of the system thereto will occur to those skilled in the art; for example, any of the numerous known devices for providing a fluorescent screen image of the ground pattern (e. g., the so called Plan Position Indicator of radar systems) may be used in conjunction with the photoelectric cells described.

ELECTRICAL OR "ELECTRONIC" EMBODIMENTS

The objects of my invention may also be accomplished by embodiments thereof functioning essentially entirely by electrical or so-called "electronic" principles. That is to say, the functions performed by primarily mechanical elements in the systems heretofore described, may be performed by electrical or "electronic" devices. In Figs. 8 through 14 I have illustrated one suitable system to that end.

*General principles*

Figure 8:
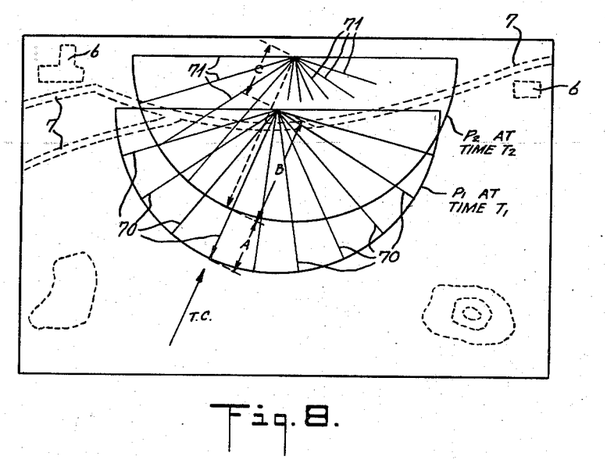
Figs. 8 through 14 illustrate the principles and circuits of an embodiment of the invention which, for the essential elements, substitutes means functioning essentially entirely by electrical or "electronic" principles in the place of their primarily mechanical counterparts in the embodiments of the preceding figures.

The essential principle of the latter "electronic" system is probably best visualized by reference to the schematic illustration of that principle in Fig. 8 and to the following explanation thereof. Analogously to Fig. 2, let it be assumed in connection with Fig. 8 that the aircraft is traveling along some true source vector TC and that means are provided for taking a plurality of substantially instantaneous images or pictures of the ground pattern below by analyzing successive line-like sections of each picture extending radially from a given center thereof, such line-like sections being taken along a sufficient number of radii to cover some usable portion of the ground pattern falling within the field of view. For example, such a picture may be taken by successive scanning along radial lines in a manner common in the art of cathode ray tubes as used in radar and like systems. It will be understood that such a picture may be completed within some substantially instantaneous, though finite, interval of time sufficiently short that the aircraft may be considered as not having moved sufficiently during the interval to make any great change in the ground pattern image observed.

Let it now be assumed that a successive plurality of such instantaneous pictures are taken as the plane moves along its course. This is illustrated by Fig. 8. A first picture at a time $T_1$ (actually a short interval of time but assumed to be instantaneous for purposes of illustration) is taken by a line by line analysis of line-like sections along the indicated radial lines 70. Normally there will be a great number of such lines 70 closely spaced, but, for simplicity of illustration, only a few are shown. Shortly thereafter, at a second time $T_2$, a second picture $P_2$ is taken similarly along the indicated radial lines 71, but, as will be apparent, the picture $P_2$ has been shifted along the true course direction TC due to the movement of the plane. Thereafter a continuing succession of pictures $P_3$, $P_4$, $P_5$, $P_6$ . . . are taken as the plane continues along the true course TC.

Now then, it will be apparent that at least one of the radial line-like picture sections of each picture $P_1$ and $P_2$ will coincide in direction with the true course vector TC, and such sections in $P_1$ and $P_2$ will coincide with each other, at least for some common portion, except for their displacement in time. That is to say, some common portion B of the radial sections of the two pictures $P_1$ and $P_2$ along TC will cover the identical strip of the ground pattern below. Only such portions A and C will not correspond because of the movement of the plane. (The radii are shown as slightly displaced laterally only for clarity of illustration.)

This situation may be adapted to the realization of the objects of the invention by electrical or "electronic" means which compare the radial line-like sections or elements of the pictures $P_1$ and $P_2$ section by corresponding section and select those radial sections in each in which a common image portion B is found. In so doing it will have selected the true course vector TC and suitable means to indicate the same may be provided. At the same time, in the act of comparing, a time displacement operation will be necessary in order to bring the electrical signal patterns corresponding to pictures $P_1$ and $P_2$ into synchronism. The amount of such time displacement in the comparison operation will obviously be a measure of the distance which the aircraft has traveled in the interim between pictures and by the same token it will be a measure of the velocity of the aircraft which can likewise be indicated by suitable means. If successive odd numbered pictures $P_3$, $P_5$, $P_7$ . . . are compared with their sequential even numbered counterparts $P_4$, $P_6$, $P_8$ . . . in the same manner, a continuous indication of both TC and ground velocity may be had.

*Selecting, indicating and regulating*

Figure 12:
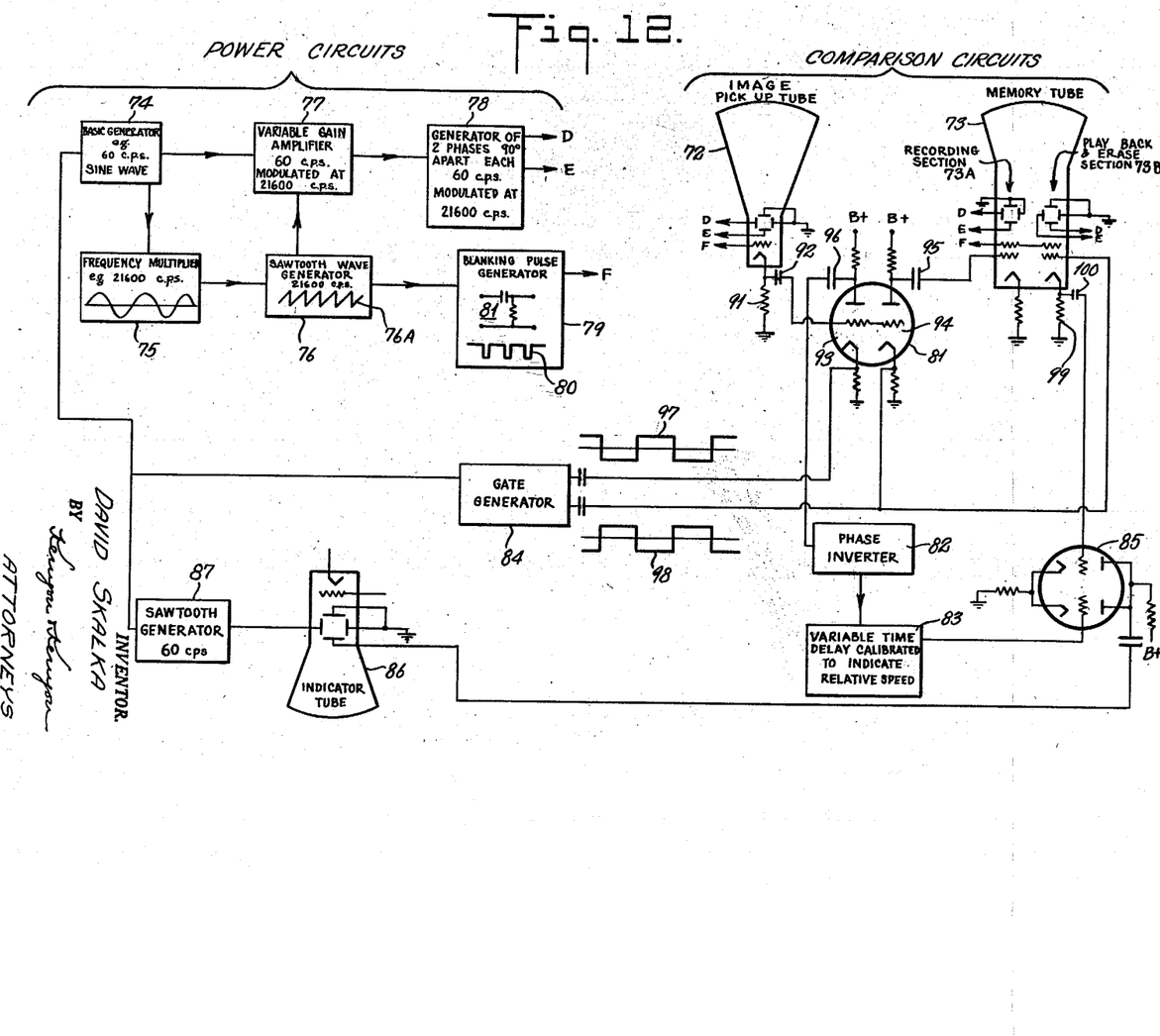
Figure 13:
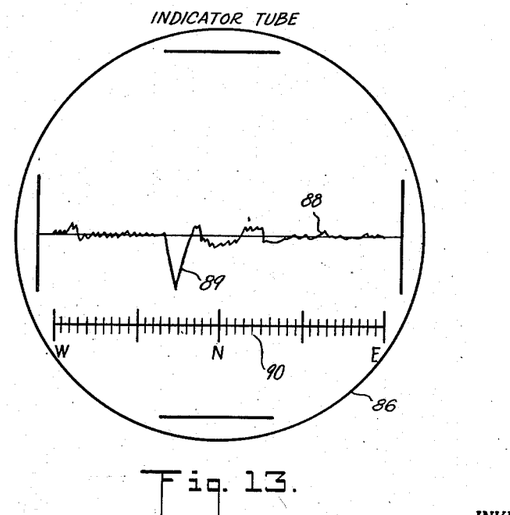

In Fig. 12 I have shown schematically a circuit for performing the operations just described. But before entering upon a detailed description of that circuit, it may be well to explain one of the essential elements thereof, namely the cathode ray tube structures which are to take the pictures and hold those having odd numbers for comparison with those even numbered pictures which follow them successively. The essential tube constructions are illustrated only schematically in Fig. 12 and designated "the image pick-up tube" 72 and the "memory tube" 73. The "pick-up tube" 72 may be of the conventional "camera tube" type employed, for example, in television or radar systems although, if greater sensitivity be desired, a tube of the so-called "image-orthicon" type may be preferred because of the generally low light levels involved in operations such as that contemplated by the invention. The "memory tube" may be of a special type now developed and which will pick up and record the image $P_1$ and its odd numbered successors at their proper times and hold them so that they may later be repeated or "played back" for subsequent comparison respectively with the picture $P_2$ and its even numbered successors. Such a "memory tube" is constructed in such a manner that it will record the image $P_1$ by scanning on its fluorescent screen after the same has been picked up by scanning of the "image pickup tube" screen and a signal corresponding to it transmitted to the "memory tube" through the circuit to be described later. At the desired later time, the "memory tube" will repeat or "play back" the memorized image $P_1$ by scanning the same from its fluorescent screen and transmitting a signal corresponding to it through circuits to be described for comparison with a signal corresponding to image $P_2$ then coming from the "pick-up tube" and through other portions of the circuit. At the same time, the "memory tube" will erase from its fluorescent screen the first memorized picture $P_1$ so that the screen is in condition to receive and memorize subsequent odd numbered pictures in the same manner.

"Memory tubes" of this character have now been developed in the art of cathode ray tubes and are described, for example, in an article entitled "A Memory Tube" by Andrew V. Haeff appearing in "Electronics," vol. 20, No. 9, page 80, September 1947. This article describes a tube for "writing," "holding," and "reading," which are the counterparts of the "recording," "holding" and "play-back" referred to in this description.

Figures 9, 10:
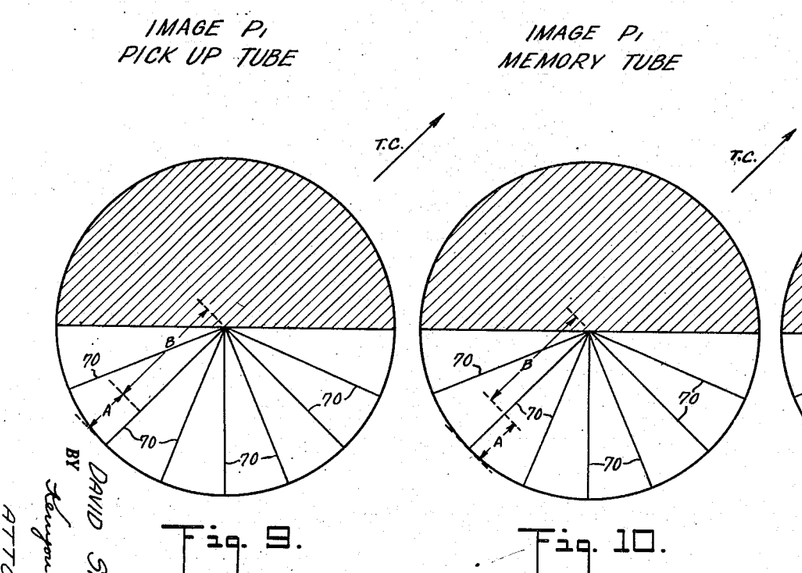
Figure 11:
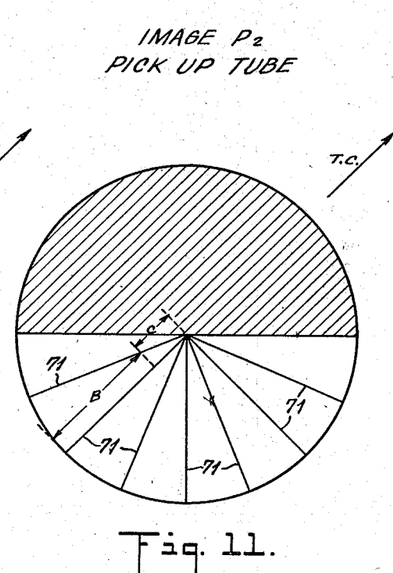

For a better realization of the above and following description, typical images picked up and memorized by these tubes 72 and 73 are illustrated in Figs. 9 through 11. Fig. 9 represents the image appearing on the fluorescent screen of the "pick-up tube" 72. As with memory tube 73, only the lower half is utilized for purposes of simplicity of illustration, the upper half having been blanked out by a suitable opaque covering. As indicated by the schematic radial scanning lines 70, the image $P_1$ will include the portions A and B corresponding to those of Fig. 8. As Fig. 10 indicates this identical image is transmitted to the fluorescent screen of the "memory tube" 73, and is stored there momentarily in the precise form in which it was picked up by the "pick-up tube." As Fig. 11 indicates, the next following image $P_2$ is picked up on the "pick-up tube" screen and takes the form in which the portion B corresponding to the same portion in Fig. 8 is positioned slightly farther toward the periphery of the screen, the portion C completing the section as before. The circuits to be described will now take the entire image $P_1$ from the "memory tube" screen of Fig. 10 and compare it with the entire image $P_2$, taken from the "pick-up tube" screen of Fig. 11, by corresponding line-like sections, but after the electrical signal corresponding to $P_2$ has been suitably delayed in time so that the electrical signals of the two images, $P_1$ on the "memory tube" and $P_2$ on the "pick-up tube," will be in synchronism.

For a more detailed understanding of the functioning of the "electronic" embodiment of my invention reference is now made to Fig. 12 schematically indicating the complete circuit. For convenience of understanding the circuit may be considered as grouped by elements into the two indicated sections: the power circuits which are largely conventional, and the essential comparison circuits of the invention.

Power circuits

The power circuits comprise any of the conventional systems for causing radial scanning of cathode ray tubes in the manner common with cathode ray tube practice in the arts of radar, etc. It may be considered as beginning with a basic sine wave generator 74 of some frequency $f_0$ which, for convenience, may be the frequency of common power sources, i. e., 60 cycles per second. As a first step in establishing the voltage which will sweep the cathode ray beam along a radial path, there is provided the frequency multiplier 75 controlled by the basic generator 74 and arranged to step-up its frequency to some convenient higher value. As will be seen later, the ratio of frequency multiplication will depend on the number of radial line elements desired for each complete circular sweep of the picture. If this ratio be $n$, then the new frequency will simply be $nf_0$, and, for spaced radial line elements such that there is one for each angular degree of the picture, the ratio $n$ is 360 and the new higher frequency must be $360 \times 60$ or 21,600 cycles per second. Since conventional circuits for performing such frequency multiplication and for controlling it with the basic generator are well known, its details are likewise not outlined.

The output of the frequency multiplier 75 is supplied to a sawtooth wave generator 76 of the type well known in the cathode ray art and therefore not detailed. Its function, as is well known, is to provide a voltage which will move the cathode ray beam outwardly along a radial path and then instantaneously return it to the center. To that end it will have a "sawtooth" wave form 76A as indicated. Both the basic generator 74 and the sawtooth wave generator 76 feed into a variable gain amplifier 77, likewise a conventional device. As will be well understood by those skilled in the art, the variable gain amplifier will thus produce a sine wave voltage of the frequency of the basic generator which is modulated by the sawtooth wave generator 76, i. e., in the example given a 60 cycle sine wave, saw-tooth modulated at 21,600 cycles per second.

The output of the variable gain amplifier is next fed to a two phase generator 78 which divides the amplitude modulated 60 cycle wave into equal components of 90° phase difference, each of which may be considered as an output of one of the lead connections D and E. As will be well understood by those skilled in the cathode ray art, the application of these two phase displaced voltages at D and E to the horizontal and vertical deflection plates of the image and "memory tubes" 72 and 73, as indicated, will cause an electron beam coming from the cathode of such tubes to move from the center of the fluorescent screen to the periphery and then suddenly jump back to the center, repeating the process on successive different radii of the screen progressing around the circumference thereof substantially in the manner indicated by the preceding Figs. 8 through 11. Again the circuit details of the two phase generator 78 are not shown since they are well known.

The blanking pulse generator 79 is an optional element in the present arrangement and its function is likewise well known. Its function is to generate a voltage at F having a wave form as indicated at 80 which may be applied to, as indicated, grids of the "pick-up" and "memory tubes" to blank out completely their electron beams while returning from the periphery of the fluorescent screen to the center thereof. This simply improves the clarity of the image by eliminating fluorescent lines due to return sweeps of the beam to the center which might tend to confuse. Circuits of this nature are also well known although I have sketched a simple resistor-condenser circuit 81 which generates such a pulse when energized by the sawtooth wave voltage of generator 76.

Comparison circuits

From what has already been stated and from the known practices in such arts as television and radar, it will be understood how the "image pickup tube" 72 will "take a picture of" a long succession of ground images by rapid radial scanning of successive radial sections thereof. It will be the function of the gating tube 81 to transfer the signals of all odd numbered images $P_1$, $P_3$, $P_5$, . . . so taken to the recording section of the "memory tube" 73 and to prevent their transfer to phase inverter 82. It is also the function of the gating tube 81 to transfer the signals of all even numbered images $P_2$, $P_4$, $P_6$, . . . to the phase inverter 82, while at the same time preventing their transfer to the "memory tube." To this end, the action of the gating tube 81 is controlled by the gate generator 84.

It is the function of phase inverter 82 to reverse the phase or polarity of the even numbered picture signals; while variable time delay means 83 retards them by a sufficient amount of time to permit their being synchronized with the odd numbered picture signals—all this for reasons presently to be discussed.

Returning to the "memory tube" 73, it may be considered as composed of two separate tube sections, the one 73A recording an image on the screen and the other 73B playing it back; both sections utilize the same fluorescent screen. It is the function of the play-back section to take each odd numbered image $P_1$, etc., originally recorded or "memorized" by the screen of the tube and transfer it to the comparison tube 85 wherein it is compared, corresponding line for corresponding line, with the next following even numbered image $P_2$, etc., which has been suitably time delayed by the element 83 such that the electrical signals for each radial line of the picture $P_1$ will be in time relation with the corresponding signal of the corresponding radial line of the picture $P_2$. In other words, for any given corresponding lines of the two pictures $P_1$ and $P_2$, for example, the lines corresponding to TC, the instantaneous electrical signal at some given point of the portion B along the radius corresponding to TC in $P_1$ will be injected into the comparison tube 85 at the identical instant that its counterpart signal for the counterpart point of portion B along the radius corresponding to TC in $P_2$ is injected into the tube 85. The signals however are in reverse polarity because inverter 82 has reversed the phase of even numbered picture signals which means that if the two signals are identical in amplitude as will be the case when the lines scan the section B, there will be no output from the tube 85. At all other points in the two pictures there will be no such cancellation since the signals will generally be different. Thus, by providing an indicator which will indicate just when this complete cancellation of the two signals occurs one will have an indication of the line in which common portion B occurs, i. e., the line corresponding to TC.

One possible indicator to serve the latter purpose is the cathode ray indicator tube 86 and its accompanying sawtooth wave generator 87. The function of the sawtooth wave generator 87 is to cause the electron beam of the tube 86 to scan horizontally across the screen thereof in synchronism with the frequency of the basic generator 74 (60 cycle) which of course is the frequency at which the successive pictures $P_1$, $P_2$, $P_3$, $P_4$, $P_5$, . . . are repeated. The signal coming from the comparison tube 85 may then be imposed on the opposite or vertical plates of the tube 86 and the net result will be that when the signals corresponding to the section B cancel out within the comparison tube 85, there will be a dip in the trace caused by the scanning beam of the tube 86. The manner of this performance will be understood by those understanding the art of cathode ray tubes. As far as the net results are concerned, the same will appear to the operator in a form indicated by Fig. 13 which represents a picture of the screen of the tube 86. As there seen, there will appear on the face of the tube a cathode ray impingement line image which in general will take some irregular form due to the fact that for greater portions of the pictures $P_1$ and $P_2$ there will be no cancellation of the signals in the tube 85. However, when such cancellation does occur for the section B, a sharp dip 89 in this irregular trace of line 88 will occur and the position of it will be an indication of the angular position of the vector TC. Therefore the scale or face of the tube 86 may be calibrated as indicated by the scale 90 to indicate the direction TC, i. e., it may be calibrated in terms of the compass directions north, east, south or west.

Coming back to further details of the comparison circuit the signal taken from the "pick-up tube" 72 appears across its cathode resistor 91 and from there is transferred through the capacitor 92 to the common grid of the gating tube 81. The two sections 93 and 94 of the latter (each comprising a cathode resistor, cathode, their common grid, and an anode) may be considered as equivalent to a single pole double throw switch controlled by the gate generator 84. During the time of the first picture $P_1$, and others of odd numbers, section 94 is closed and section 93 is open. Section 94 therefore transfers the signals of odd numbered pictures to the "memory tube" recording section through the capacitor 95; the open part 93 prevents their transfer to phase inverter 82 through capacitor 96. During the time of the picture $P_2$ and others of even number, the action is reversed, i. e., the section 93 is closed and the section 94 is open. In that situation, the signals of even numbered pictures cannot be transmitted by the section 94 and instead they are transmitted by the section 93 through the capacitor 96 to the phase inverter 82. At the same time, as the signals of even numbered pictures begin being transmitted to the phase inverter 82, the action of the play-back section is initiated by the connection of its grid to the cathode of section 94.

The action of the gating generator 84 in performing or controlling this alternating switching and initiation of play-back action will be well understood by those skilled in the "electronic" arts. The gating generator is a circuit arranged to generate two square wave voltages in 180° phase displacement such as indicated by the wave forms 97 and 98 on the figure. Numerous types of circuits are available for the purpose, for example, conventional multivibrator circuits. In the illustrated embodiment, the frequency of the square wave output of the gating generator is controlled by the basic generator 74 in order that the gating action be in synchronism with the successive alternation of pictures. Thus the gating generator may be adjusted to vibrate at the first sub-harmonic of the 60 cycle wave of the basic generator, i. e., at 30 cycles per second. The negative half cycle of wave 98 may then occur during the time of the pictures of odd numbers $P_1$, $P_3$, $P_5$, etc., to cause section 94 then to conduct (close the single pole double throw switch on the section 94 side) by lowering its cathode potential; conversely, during the time of the pictures of even numbers $P_2$, $P_4$, $P_6$, etc. The positive half cycles of wave 98 will occur and raise the cathode potential thereby to stop conduction (open the switch). Similarly, wave 97 will function to cause conduction in section 93 during the time of even numbered pictures $P_2$, $P_4$, $P_6$, etc., and prevent conduction during the time of the odd numbered pictures. By this action the odd numbered pictures will be switched to the "memory tube" and the even numbered pictures to the phase invertor 82 in the sequence already outlined. It is also apparent that during the time of the even numbered pictures the positive half cycles of wave 98 will raise the potential of the grid of the play-back section 73B of the "memory tube" to permit play-back action which allows the stored picture to be transferred to the comparison tube 85 by way of the cathode resistor 99 of the play-back section and the capacitor 100.

Phase inverter 82 may be any of the conventional devices which will reverse the phase or polarity of even numbered picture signals to permit them to oppose or cancel out those of the odd numbered pictures.

As to the variable time delay 83, this as already indicated, is necessary in order successfully to compare the even numbered picture with the stored odd numbered pictures. The former must be slowed down or delayed in time because they are taken at an instant after the latter by reason of the movement of the plane during the interim. The amount of advance depends on the speed of the plane and therefore the time delay introduced must vary to correspond with the plane speed. It may thus be used to measure the velocity of the plane depending on the amount of delay required for cancellation of the sections B of the tube picture signals. Various time delay circuits are well known and therefore the details are not illustrated. Most of them are based on a "delay line" which is a transmission line with a very large distributed capacitance and inductance and consequently a low phase velocity.

*Automatic selection, indication, and regulation*

Analogously to the system of Figs. 1 through 7, means may also be employed in the system of Fig. 12, for providing an automatic and continuous indication of the true course vector TC and the instantaneous velocity of the aircraft. Like the arrangement of Fig. 5 of the earlier embodiment, such means may function to select a signal corresponding to the true course vector, which may be used similarly to control and continually adjust motor means controlling time delay element 83 in such manner that a dip corresponding to the true course vector will always appear in the output of the comparison tube 85.

Figure 14:
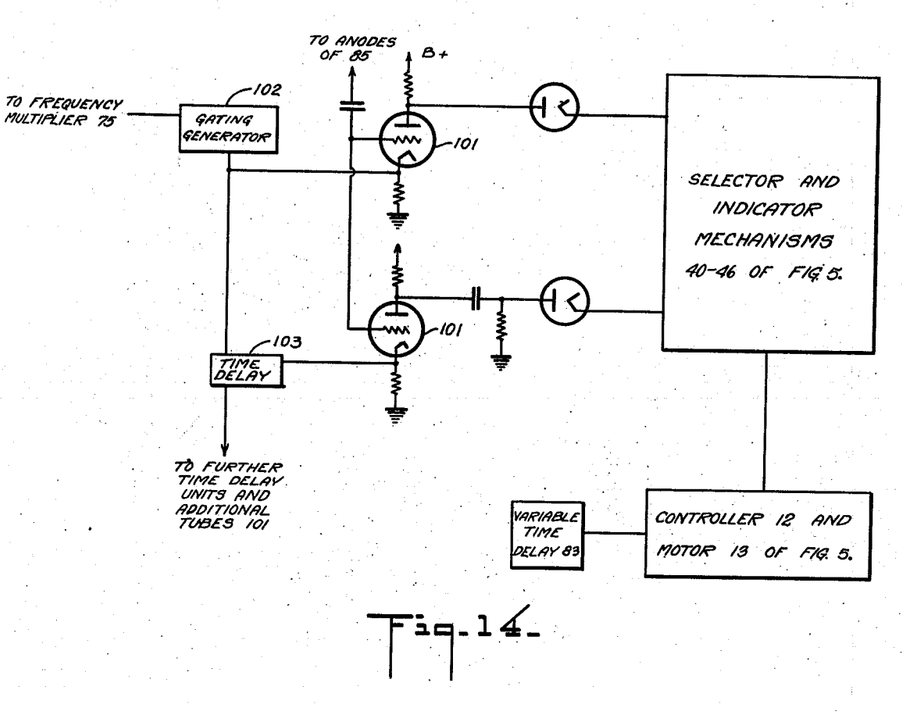

A system for obtaining this operation is illustrated schematically in Fig. 14. It may comprise simply a number of tubes 101 all having their grids connected to the output from the comparison tube 85 and all normally biased beyond cutoff, that is, to the point where no current normally flows through the tubes. A second gate generator 102 may be provided and actuated by the frequency multiplier 75 in a manner similar to that in which the first gate generator 84 was actuated by the basic sine wave generator 74. From this second gate generator, a gating pulse may be applied to the first of the tubes 101 which will allow it to conduct for a length of time corresponding to one radius scanning which might be called time $t$. Suppose now that the gating pulse be delayed by another amount $t$ and applied to the second tube 101; and then delayed by an amount of time $2t$ and applied to the third tube, etc. These delays may be effected by the indicated delay circuits 103. If a dip is present in the grid signal applied to a tube 101 when it is gated to conduct there will be no output; all the other tubes when gated to conduct will show an output. If now the outputs of these tubes are fed to an indicating device in exactly the same manner as the outputs of the rectifier tubes 39 were fed to the indicator in Fig. 5, then the same results would be obtained, i. e., the indicator would point to the tube from which the dip was coming, which would be that corresponding to the true course vector TC. The same control circuit as was used to control the motor speed in Fig. 5 could be used to control a motor here which would automatically vary the variable delay until the correct delay was found to give the dip.

With the foregoing descriptions of principles and apparatus in mind, it will now be apparent that numerous applications to related navigation problems experienced in the operation of aircraft and like devices, as well as numerous modifications in structure or mode of operation, will occur to those skilled in the art. Among these may be mentioned the fact that the angular velocity of the objects moving with respect to the observation point may be measured in the stead of the linear velocity. If angular velocity will suffice for the particular purpose at hand the altitudes or distance between the observation point and the moving object need not enter, and means to measure it need not be employed. Thereby any small errors in the latter means or errors inherent in the geometry of the directions of observation of the ground points will likewise be eliminated. Moreover, it will be apparent that the invention is equally applicable to situations wherein the measuring apparatus is associated with the relatively fixed member of the system, for example, where the apparatus described is on the ground and is observing the motion of a plane in the air. Further, it may be applied in conjunction with conventional devices for integrating or measuring the total distance traveled ("air miles counters") to determine more accurately the true ground position of the craft; or in conjunction with predetermined course maps to govern flight along a desired course. All such modifications as fall within the true spirit and scope of my invention I aim to include within the scope of the appended claims.

What I claim is:

1. A system for determining at least one of the parameters, speed and direction relative to a body, of an object in motion comprising cathode ray tube means for observing a plurality of successive images of said body on a cathode ray tube screen as said object moves with respect thereto, means for sectionally analyzing each of said images by radial scanning of a cathode ray beam in a plurality of radial directions aligned with a plurality of possible directions of the apparent motion of said images of said body with respect to said object, and means for determining the actual direction of said apparent motion including an electrical device for selecting that direction of motion of said ray in which identical sectional analyses in different such images occur.

2. A system as in claim 1 including a cathode ray tube indicator actuatable by said device for indicating the selected direction.

3. A system as in claim 1 including an indicator responsive to the time interval between successive such images for indicating the speed of motion of said object relative to said body.

4. An aircraft navigation system for determining at least one of the parameters, speed and direction relative to the earth of an aircraft in motion comprising cathode ray tube means for observing a plurality of successive images of the earth on a cathode ray tube screen as said aircraft moves with respect thereto, means for sectionally analyzing each of said images by radial scanning of a cathode ray beam in a plurality of radial directions aligned with a plurality of possible directions of the apparent motion of said images of the earth with respect to said aircraft, and means for determining the actual direction of said apparent motion including an electrical device for selecting that direction of motion of said ray in which identical sectional analyses in different such images occur.

5. A system as in claim 4 including a cathode ray tube indicator actuatable by said device for indicating the selected direction.

6. A system as in claim 4 including an indicator responsive to the time interval between successive such images for indicating the speed of motion of said aircraft relative to the earth.

DAVID SKALKA.

References Cited in the file of this patent

UNITED STATES PATENTS

| Number | Name | Date |
|---|---|---|
| 1,385,776 | Chamberlain | July 26, 1921 |
| 1,449,387 | Fairchild | Mar. 27, 1933 |
| 1,919,126 | Perkins | July 18, 1933 |
| 1,963,826 | Chilton | June 19, 1934 |
| 2,237,440 | Jones | Apr. 8, 1941 |
| 2,292,153 | Olson | Aug. 4, 1942 |
| 2,292,641 | Jones | Aug. 11, 1942 |
| 2,298,476 | Goldsmith | Oct. 13, 1942 |
| 2,363,600 | Lawlor | Nov. 28, 1944 |
| 2,370,966 | Jochum | Mar. 6, 1945 |
| 2,399,014 | Foster | Apr. 23, 1946 |
| 2,425,541 | Konet | Aug. 12, 1947 |
| 2,446,845 | Morrison | Aug. 10, 1948 |
| 2,465,957 | Dienstbach | Mar. 29, 1949 |
| 2,479,569 | Harschel | Aug. 23, 1949 |
| 2,481,410 | Goldsmith | Sept. 6, 1949 |
| 2,482,795 | Philabaum | Sept. 27, 1949 |
| 2,489,218 | Herbold | Nov. 22, 1949 |
| 2,489,219 | Herbold | Nov. 22, 1949 |
| 2,504,108 | Clopton | Apr. 18, 1950 |

OTHER REFERENCES

Pages 633–636 of R. C. A. Review, vol. 8, December 1947, No. 4.